United States Patent
Deman et al.

(10) Patent No.: US 7,386,088 B2
(45) Date of Patent: Jun. 10, 2008

(54) METHOD AND SYSTEM FOR ITERATIVE IMAGE RECONSTRUCTION

(75) Inventors: Bruno Kristiaan Bernard Deman, Clifton Park, NY (US); Samit Kumar Basu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 613 days.

(21) Appl. No.: 10/950,786

(22) Filed: Sep. 24, 2004

(65) Prior Publication Data

US 2006/0072801 A1    Apr. 6, 2006

(51) Int. Cl.
A61B 6/03        (2006.01)
(52) U.S. Cl. .................... 378/4; 378/901; 382/131
(58) Field of Classification Search ............ 378/4, 378/901; 382/131
See application file for complete search history.

(56) References Cited

U.S. PATENT DOCUMENTS 6,507,633 B1 * 1/2003 Elbakri et al. ............ 378/8

OTHER PUBLICATIONS

Yin, Quantitative brain SPECT with fan beam collimation, Doctoral Dissertation, Oct. 1996, Emory University, Publication No. AAT 9625969.*

De Man, Iterative Reconstruction for Reduction of Metal Artifacts in Computed Tomography, May 2001, ISBN 90-5682-300-0.*

Jinhua Sheng, et al , "An improved maximum likelihood approach to Image Reconstruction Using Ordered Subsets and Data Subdivisions", Feb. 2004, IEEE Transactions on Nuclear Science, vol. 51, No. 1, pp. 130-135.

SH Manglos, et al, "Transmission maximum-likelihood reconstruction with ordered subsets for cone beam CT", 1995, Phys. Med. Biol., vol. 40, pp. 1225-1241.

* cited by examiner

Primary Examiner—Edward J. Glick
Assistant Examiner—John M Corbett
(74) Attorney, Agent, or Firm—Jason K. Klindtworth; Curtis B. Brueske (57) ABSTRACT

A method for iteratively reconstructing image data acquired by a computed tomography system is provided. The method comprises generating a calculated sinogram from an image estimate and generating an error sinogram based on the calculated sinogram and a measured sinogram. Then, one or more backprojections are performed, each based upon a reconstruction parameter. The reconstruction parameter impacts at least one of convergence speed and computational cost of each iterative step and corresponding reconstruction. A filtering step is performed prior to performing the one or more backprojections. Finally, the initial image is updated by adding corresponding results of the one or more backprojections to the image estimate to obtain the reconstructed image.

25 Claims, 5 Drawing Sheets

METHOD AND SYSTEM FOR ITERATIVE IMAGE RECONSTRUCTION

BACKGROUND OF THE INVENTION

The present invention relates generally to the field of imaging systems. In particular, the invention relates to a method for iteratively reconstructing image data acquired from a computed tomography imaging system.

Computed Tomography (CT) scanners operate by projecting fan shaped or cone shaped X-ray beams through an object. The X-ray beams are generated by an X-ray source, and are generally collimated prior to passing through the object being scanned. The attenuated beams are then detected by a set of detector elements. Each detector element produces a signal based on the intensity of the attenuated X-ray beams, and these signals are processed to produce projection data, also called sinogram data. By using reconstruction techniques, such as filtered backprojection, useful images are formed from the projection data.

A computer is able to process and reconstruct images of the portions of the object responsible for the radiation attenuation. As will be appreciated by those skilled in the art, these images are computed by processing a series of angularly displaced projection data. These data are then reconstructed to produce reconstructed images, which are typically displayed on a cathode ray tube, and may be printed or reproduced on film.

Direct reconstruction techniques, such as filtered backprojection are generally fast and computationally efficient, since they allow reconstruction of a three-dimensional image data set in a single reconstruction step. Unfortunately, most direct reconstruction techniques exhibit relatively poor image quality with a low contrast and a significant artifact level.

Iterative reconstruction techniques improve image quality through an iterative step. Iterative reconstruction techniques perform an initial reconstruction followed by iterative updates of the two or three-dimensional image data set until some threshold criteria are met. In particular, iterative reconstruction techniques reduce image noise for a given dose, or equivalently, reduce the dose required to achieve a given noise, have increased geometrical flexibility and are capable of modeling the physics of the acquisition, thereby increasing the robustness against artifacts.

However, iterative reconstruction techniques require enormous amounts of computation and are not useful in practice unless the volume to be reconstructed is small. In addition, iterative reconstruction techniques are much slower than direct reconstruction techniques, generally requiring 10-100 times the computational cost as compared to direct reconstruction techniques. Some known techniques for reducing the computational cost of iterative reconstruction techniques include ordered subsets, relaxation factors, and acceleration of the projector and back projector. However, these techniques, which can be applied in general to any iterative reconstruction technique known in the art, do not sufficiently reduce the computation time to enable routine use of iterative reconstruction.

An iterative reconstruction technique that effectively reduces the required computational cost per iteration and reduces the number of iterations by improving the convergence properties is therefore desired.

BRIEF DESCRIPTION OF THE INVENTION

Embodiments of the present technique address this and other needs. In one embodiment, a method for iteratively reconstructing an image acquired by a computed tomography (CT) system is provided. The method comprises generating a calculated sinogram from an image estimate and generating an error sinogram based on the calculated sinogram and a measured sinogram. Then, one or more backprojections are performed, each based upon a reconstruction parameter. The reconstruction parameter impacts at least one of convergence speed and computational cost of each iterative step and corresponding reconstruction. A filtering step is performed prior to performing the one or more backprojections. Finally, the initial image is updated by adding corresponding results of the one or more backprojections to the image estimate. The above steps are repeated for a pre-specified number of iterations to obtain the reconstructed image.

In a second embodiment, a computed tomography system for iteratively reconstructing image data is provided. The system comprises an X-ray source configured to project a plurality of X-ray beams through an object and a detector configured to produce a plurality of electrical signals in response to received X-ray beams from the source. The system further comprises a system controller configured to process the plurality of electrical signals to generate a calculated sinogram from an image estimate. The system controller is further configured to generate an error sinogram based on the calculated sinogram and a measured sinogram and perform one or more backprojections based upon a reconstruction parameter, wherein the reconstruction parameter impacts at least one of convergence speed and computational cost of each iterative step and corresponding reconstruction. A filtering step is performed prior to the one or more backprojections. Finally, the image estimate is updated by adding corresponding results of the one or more backprojections to the image estimate. The above steps are repeated for a pre-specified number of iterations to obtain the reconstructed image.

DETAILED DESCRIPTION OF SPECIFIC EMBODIMENTS

Disclosed herein is a method and system for providing improved image quality in images generated using iterative reconstruction techniques. Embodiments of the present invention disclose techniques that effectively reduce the required computational cost per iteration and/or improve the convergence properties of iterative reconstruction techniques. The invention disclosed herein, develops novel extensions to iterative reconstruction techniques, such as for example, the Maximum Likelihood Transmission Reconstruction (MLTR) technique. These extensions, as will be described in greater detail below, result in an effective reduction of the computational cost per iteration and improve the convergence properties of the iterative reconstruction, without increasing the required number of iterations.

Iterative reconstruction techniques, in general, start with an image estimate. This image estimate is updated and transformed back and forth between the projection domain and the image domain. The particular manner in which transformation between the domains is performed distinguishes different reconstruction techniques. For instance, Iterative Filtered Backprojection (IFBP) methods use FBP to reconstruct an image and they use a Radon or Fan Beam (or other, depending on the geometry) transform to calculate a sinogram.

More specifically, in an iterative reconstruction technique, a calculated sinogram (i.e., a set of predicted projection data) is compared with the actual measured sinogram data. Initially, the calculated sinogram is a transformation from an estimated reconstructed image. In the first iteration, the reconstructed image may be any appropriate default setting. As a result of the comparison of the calculated sinogram and the measured sinogram, a sinogram error is produced. The sinogram error is then transformed back to the image domain to produce a correction image. Thus, in a subsequent iteration, the correction image is used along with the previous reconstructed image to create an updated reconstructed image for the next iteration. Thereafter, the process is repeated for a desired number of iterations or until some optimization stopping criterion is met.

Figure 1:
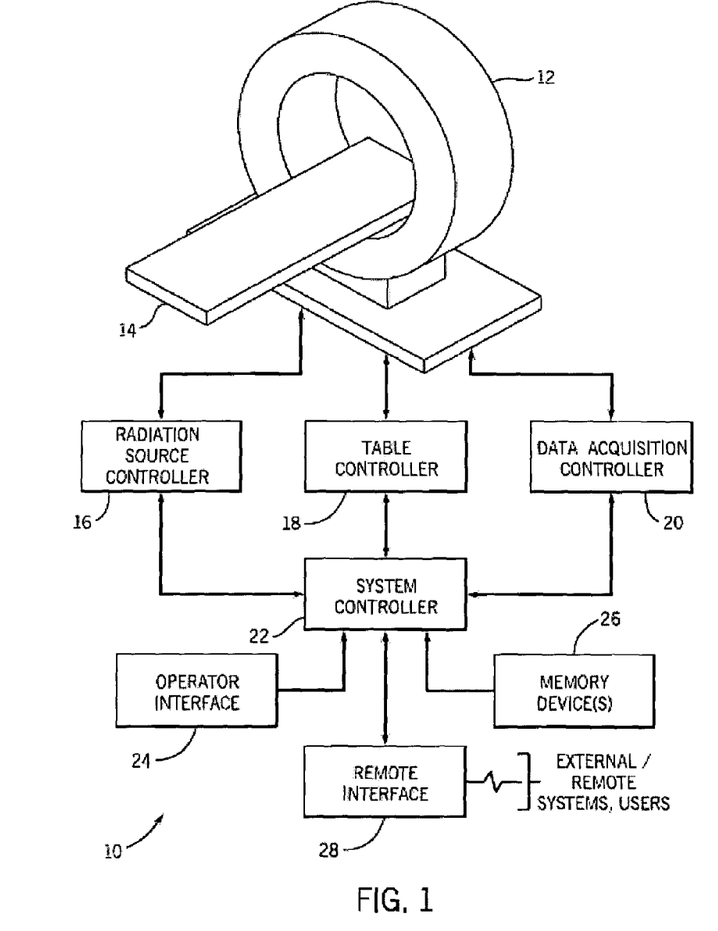
FIG. 1 is a diagrammatical representation of an exemplary CT system in accordance with aspects of the present technique.

Referring initially to FIG. 1, a computed tomography (CT) system is illustrated and designated generally by reference numeral 10. In the illustrated embodiment, the computed tomography (CT) system 10 is designed to iteratively reconstruct image data in accordance with embodiments of the present technique as will be described in greater detail below. The CT system 10 comprises a scanner 12 formed of a support structure and internally containing one or more stationary or rotational, sources of X-ray radiation (not shown in FIG. 1) and one or more stationary or rotational digital detectors (not shown in FIG. 1). The scanner is configured to receive a table 14 or other support for a patient, or, more generally, a subject to be scanned. The table can be moved through an aperture in the scanner to appropriately position the subject in an imaging volume or scanning plane during imaging sequences.

The system further includes a radiation source controller 16, a table controller 18 and a data acquisition controller 20, which may all function under the direction of a system controller 22. The radiation source controller 16 regulates timing for discharges of X-ray radiation which is directed from points around the scanner 12 toward a detector element on an opposite side thereof, as discussed below. In the case of stationary CT arrangements, the radiation source controller 16 may trigger one or more emitters in a distributed X-ray source at each instant in time for measuring multiple projection data. In certain arrangements, for example, the X-ray radiation source controller 16 may trigger emission of radiation in sequences so as to collect adjacent or non-adjacent measurements of projection data around the scanner. Many such projection data may be collected in an examination sequence, and data acquisition controller 20, coupled to detector elements as described below receives signals from the detector elements and processes the signals for storage and image reconstruction. In configurations described below in which one or more sources are rotational, source controller 16 may also direct rotation of a gantry on which the source or sources are mounted. Table controller 18 serves to appropriately position the table and subject thereon in a plane in which the radiation is emitted, or generally within a volume to be imaged. The table may be displaced between imaging sequences or during certain imaging sequences, depending upon the imaging protocol employed. Moreover, in configurations described below in which one or more detectors or detector segments are rotational, data acquisition controller 20 may also direct rotation of a gantry on which the detector or detectors are mounted.

System controller 22 generally regulates the operation of the radiation source controller 16, the table controller 18 and the data acquisition controller 20. The system controller 22 may thus cause radiation source controller 16 to trigger emission of X-ray radiation, as well as to coordinate such emissions during imaging sequences defined by the system controller. The system controller may also regulate movement of the table in coordination with such emission so as to collect projection data corresponding to volumes of particular interest, or in various modes of imaging, such as helical acquisition modes. Moreover, system controller 22 coordinates rotation of a gantry on which, either the source(s), detector(s), or both are mounted in the case of rotating CT geometries or arrangements. The system controller 22 also receives data acquired by data acquisition controller 20 and coordinates storage and processing of the data. As will be described in greater detail below, in accordance with the present technique, the system controller is configured to determine an image estimate and generate a calculated sinogram from the image estimate. The system controller is further configured to generate an error sinogram by taking a difference between the calculated sinogram and a measured sinogram. Then, the system controller is configured to perform one or more backprojections, each based upon a reconstruction parameter. In accordance with the present technique, the reconstruction parameter is configured to impact the convergence speed and computational cost of each iterative step and corresponding reconstruction. In addition, the system controller is configured to perform a filtering step prior to the one or more backprojections. Finally, the system controller is configured to iteratively update the image estimate by adding corresponding results of the one or more backprojections to the image estimate to obtain the reconstructed image.

It should be borne in mind that the controllers, and indeed various circuitry described herein, may be defined by hardware circuitry, firmware or software. The particular protocols for imaging sequences, for example, will generally be defined by code executed by the system controllers. Moreover, initial processing, conditioning, filtering, and other operations required on the projection data acquired by the scanner may be performed in one or more of the components depicted in FIG. 1. For example, as described below, detector elements will produce analog signals representative of depletion of a charge in photodiodes positioned at locations corresponding to elements of the detector used for data acquisition. Such analog signals are converted to digital signals by electronics within the scanner, and are transmitted to the data acquisition controller 20. Partial processing may occur at this point, and the signals ultimately transmitted to the system controller for further filtering and processing. In the same manner, image reconstruction may be accomplished by application specific integrated circuits residing in the system controller 22, by algorithms executed on the system controller 22, or by remote systems that can access the same data stored in memory device 26 as will be discussed in greater detail below.

System controller 22 is also coupled to an operator interface 24 and to one or more memory devices 26. The operator interface may be integral with the system controller, and will generally include an operator workstation for initiating imaging sequences, controlling such sequences, and manipulating projection data acquired during imaging sequences. The memory devices 26 may be local to the imaging system, or may be partially or completely remote from the system. Thus, imaging devices 26 may include local, magnetic or optical memory, or local or remote repositories for measured projection data for reconstruction. Moreover, the memory devices may be configured to receive raw, partially processed or fully processed projection data measurements for reconstruction.

System controller 22 or operator interface 24, or any remote systems and workstations, may include software for image processing and reconstruction. Therefore, some or all of the image processing may be performed remotely by additional computing resources based upon raw or partially processed image data. As will be appreciated by those skilled in the art, such processing of CT projection data may be performed by a number of mathematical algorithms and techniques. In accordance with the present technique, iterative reconstruction approaches are used to process and reconstruct the image data acquired by the imaging system. A remote interface 28 may be included in the system for transmitting data from the imaging system to such remote processing stations or memory devices.

Figure 2:
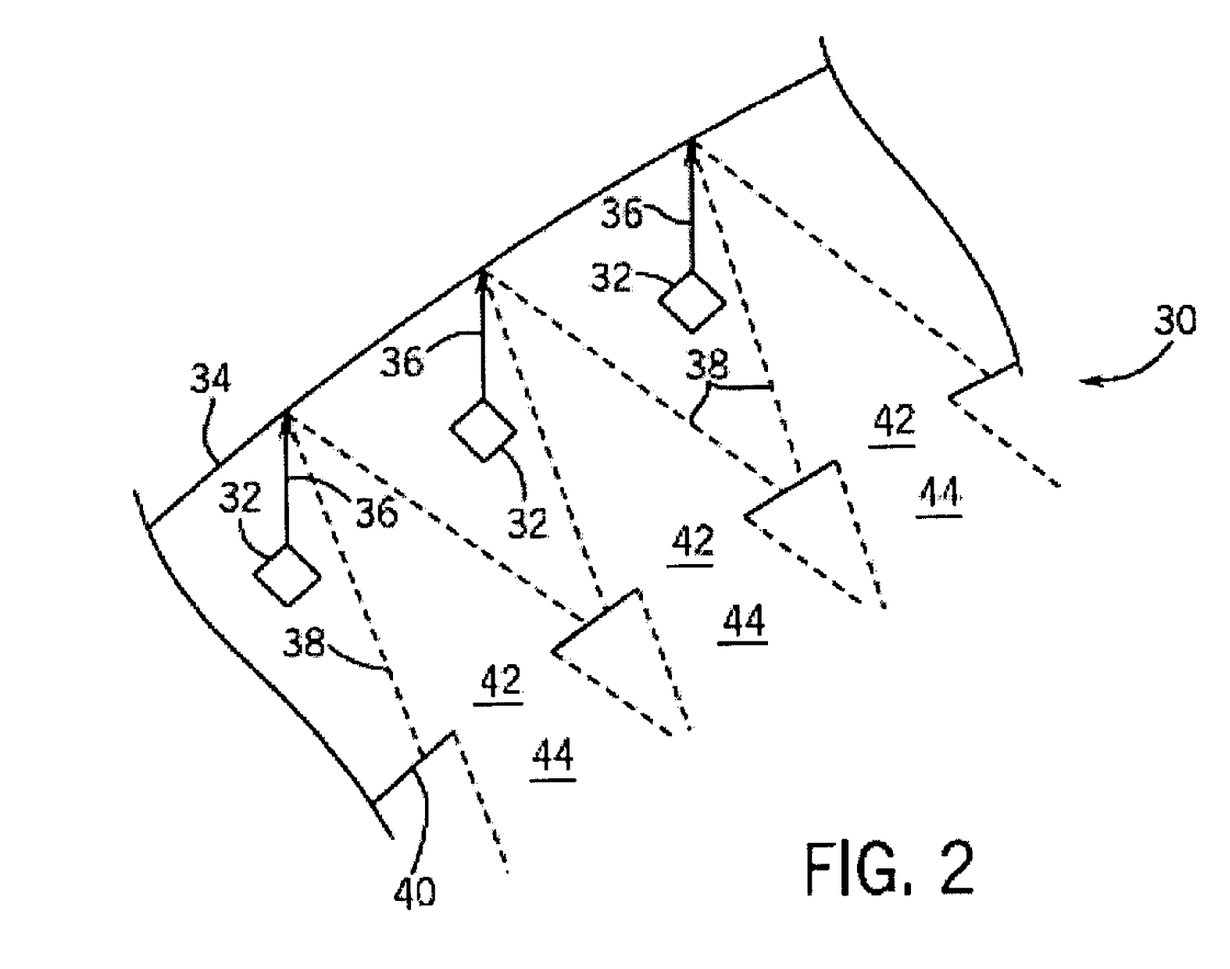
FIG. 2 is a diagrammatical representation of an exemplary distributed source for use with a system of the type illustrated in FIG. 1.

FIG. 2 illustrates a portion of an exemplary distributed X-ray source of the type that may be employed in the CT system 10 of FIG. 1. As shown in FIG. 2, in an exemplary implementation, the distributed X-ray source 30 may include a series of electron beam emitters 32 that are coupled to radiation source controller 16 shown in FIG. 1, and are triggered by the source controller during operation of the scanner. The electron beam emitters 32 are positioned adjacent to a distributed target 34. Upon triggering by the source controller, the electron beam emitters 32 may emit electron beams 36 toward target 34. The target 34, which may, for example, be a tungsten rail or element, emits X-ray radiation, as indicated at reference numeral 38, upon impact of the electron beams. In reflection mode, X-rays are meant to be produced primarily on the same side of the target as where the electrons impact. In transmission mode, X-rays are produced at the opposite side of the target. The X-ray beams 38 are directed, then toward a collimator 40, which is generally opaque to the X-ray radiation, but which includes openings or apertures 42. The apertures 42 may be fixed in dimension, or may be adjustable. Apertures 42 permit a portion of the X-ray beams to penetrate through the collimator to form collimated beams 44 that will be directed to the imaging volume of the scanner, through the subject of interest, and that will impact detector elements on an opposite side of the scanner.

A number of alternative configurations for emitters or distributed sources may, of course, be envisaged. Moreover, the individual X-ray sources in the distributed source may emit various types and shapes of X-ray beams. These may include, for example, fan-shaped beams, cone-shaped beams, and beams of various cross-sectional geometries. Similarly, the various components comprising the distributed X-ray source may also vary. The emission devices may be one of many available electron emission devices, for example, thermionic emitters, carbon-based emitters, photo emitters, ferroelectric emitters, laser diodes, monolithic semiconductors, etc. Although a distributed source configuration is specifically mentioned here, any combination of one or more rotating-anode, stationary-anode, or distributed X-ray sources may be utilized in the CT system 10.

Figure 3:
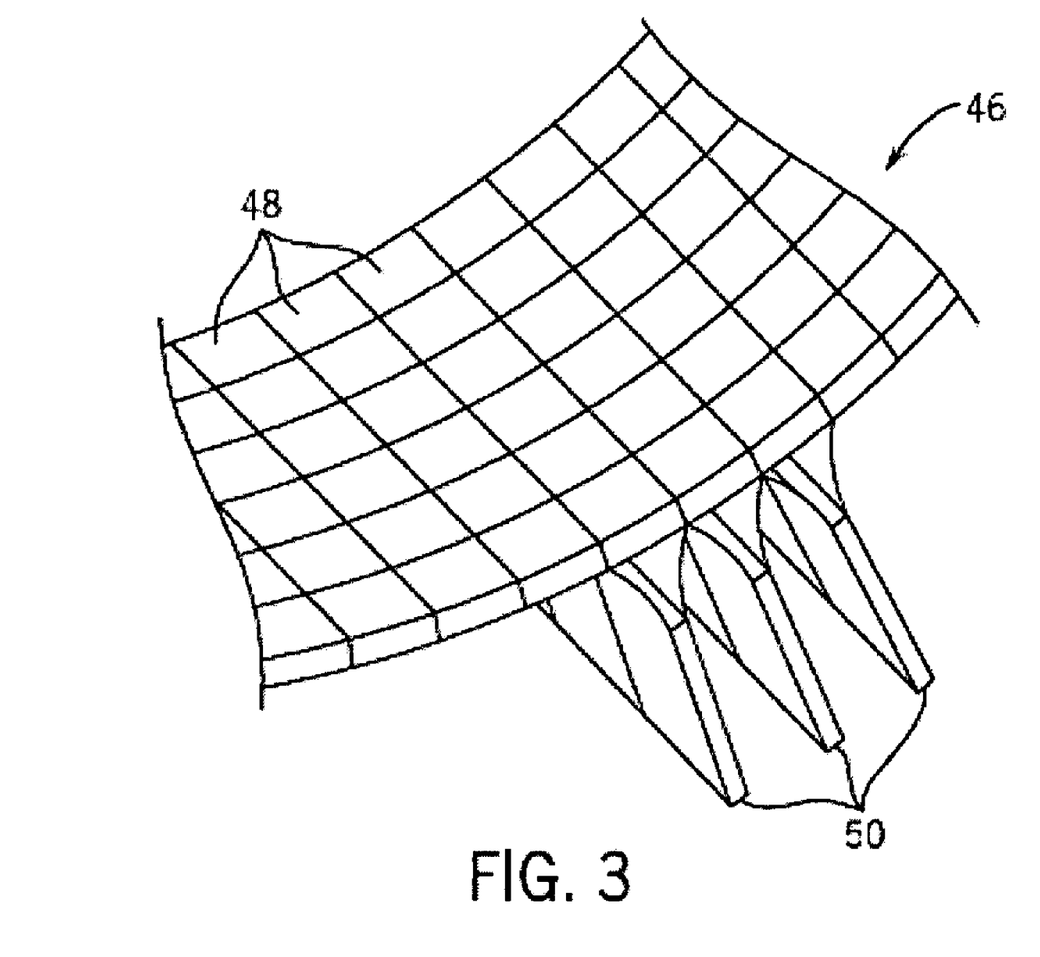
FIG. 3 is a diagrammatical representation of a portion of detector for use with the system illustrated in FIG. 1.

FIG. 3 illustrates a portion of a detector that may be employed by the CT system 10 of FIG. 1. The detector arrangement may be generally similar to detectors used in conventional rotational CT systems, but may be extended around a greater portion or the entire inner surface of the scanner in certain embodiments. Each detector may be comprised of detector elements with varying resolution to satisfy a particular imaging application. In general, the detector 46 includes a series of detector elements 48 and associated signal processing circuitry 50. These detector elements may be of one, two or more sizes, resulting in different spatial resolution characteristics in different portions of the measured projection data. Each detector element may include an array of photodiodes and associated thin film transistors. X-ray radiation impacting the detectors is converted to lower energy photons by a scintillator and these photons impact the photodiodes. A charge maintained across the photodiodes is thus depleted, and the transistors may be controlled to recharge the photodiodes and thus measure the depletion of the charge. By sequentially measuring the charge depletion in the various photodiodes, each of which corresponds to a pixel in the collected data for each acquisition, data is collected that indirectly encodes radiation attenuation at each of the detector pixel locations. This data is processed by the signal processing circuitry 50, which will generally convert the analog depletion signals to digital values, perform any necessary filtering, and transmit the acquired data to the system controller 22 of the imaging system 10 in FIG. 1 as described above. Although a detector configuration comprised of scintillation material and storage diodes is mentioned, any suitable detector for measuring X-rays may be used with the present technique.

Figure 4:
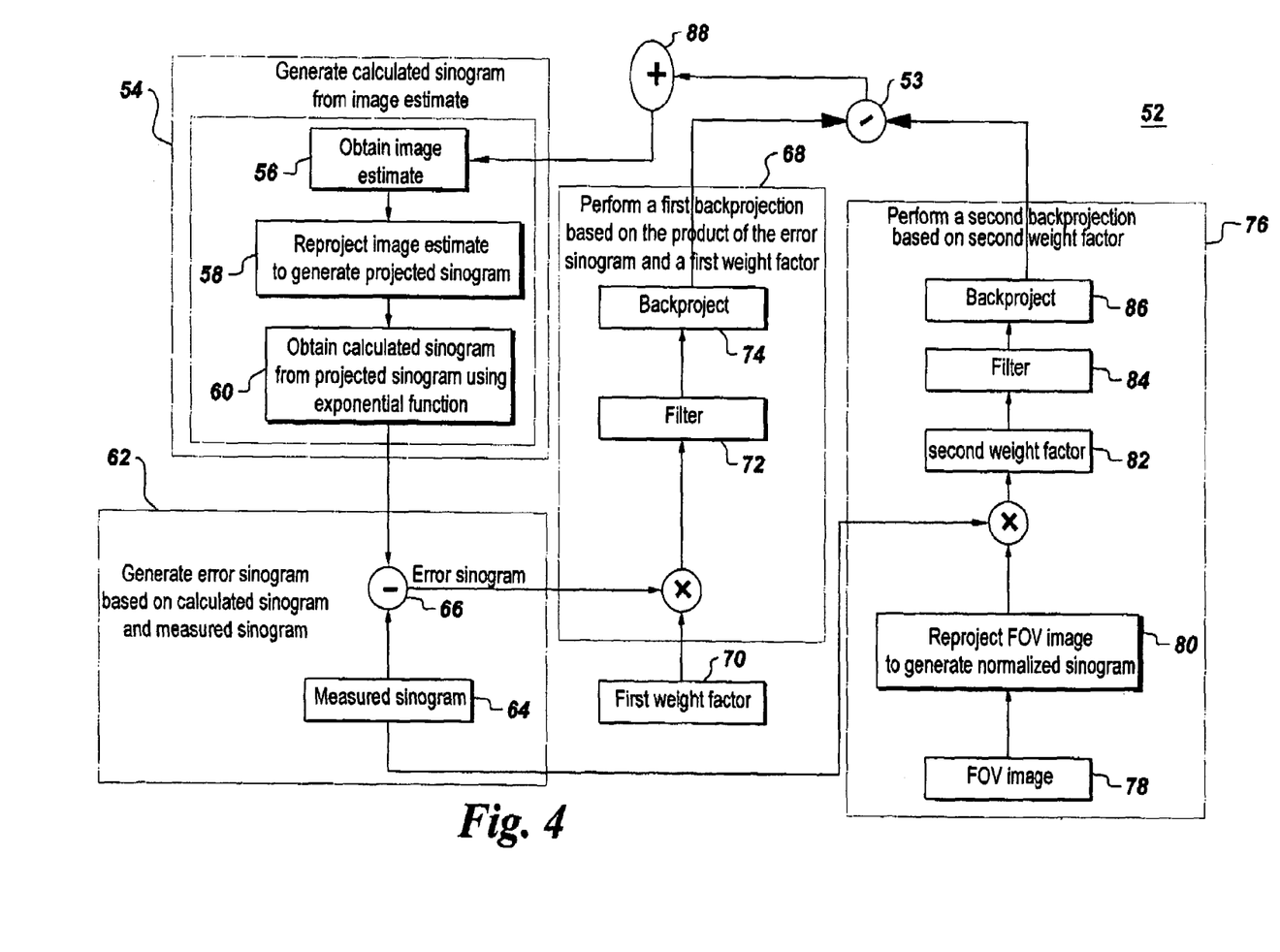
FIG. 4 is a flowchart of exemplary logic including exemplary steps for iteratively reconstructing image data acquired by the CT system of FIG. 1 in accordance with one embodiment of the present technique.

As indicated previously, iterative reconstruction techniques, in general, require enormous amounts of computation and have a high associated computational cost. Therefore, as shown in FIG. 4, a flowchart 52 is disclosed that describes exemplary logic including exemplary steps for iteratively reconstructing image data acquired by the CT system 10 of FIG. 1 in accordance with one embodiment of the present technique. In step 54, a calculated sinogram is generated from an image estimate. Step 54 further comprises obtaining an image estimate in step 56, reprojecting the image estimate to generate a projected sinogram in step 58, and obtaining a calculated sinogram in step 60. The calculated sinogram represents X-ray intensity data generated from X-ray attenuation data, using an exponential function. In accordance with this embodiment, the calculated sinogram is obtained by converting the projected sinogram from the attenuation domain to the intensity domain. More specifically, in this embodiment, an exponential function is used to convert the projected sinogram from the attenuation domain to the intensity domain to generate the calculated sinogram. The conversion is generally represented by the equation:

$$I = I\_0 * \exp(-p) \tag{1}$$

wherein, p represents the projected sinogram in the attenuation domain, $I\_0$ represents the air-scan or the intensity that is measured in the absence of a scanned object, and I represents the calculated sinogram in the intensity domain.

Referring again to FIG. 4, in step 62, an error sinogram 66 is generated by taking a difference between the calculated sinogram 60 and a measured sinogram 64. In accordance with this embodiment, the measured sinogram 64 is generated from projection data measurements acquired from the CT system 10 as described in FIG. 1. Subsequent to the generation of the error sinogram in step 62, one or more backprojections are performed based upon a reconstruction parameter. In accordance with this embodiment, the reconstruction parameter is a weight factor that impacts the convergence speed and computational cost of each iterative step and corresponding reconstruction as will be discussed in greater detail below.

In step 68, a first backprojection is performed, based on the product of the error sinogram 66 and a first weight factor 70. A filtering step 72 is performed prior to the first backprojection 74. In step 76, a second backprojection is performed, based on a second weight factor 82, which comprises a normalization term generated in step 80. A filtering step 84 is performed prior to the second backprojection 86. In accordance with the present technique, the normalization term is pre-calculated based on reprojecting a field of view (FOV) image 78. The FOV image is a unity image (that is, an image containing all 1's) and indicates which image pixels are to be used to explain the measurements in the sinogram. The reprojected normalization term is thus determined by the number of image pixels that impact a given sinogram element. In step 88, the image estimate 56 is updated by adding the result of the ratio 53 of the first backprojection 74 and the second backprojection 86 to obtain the reconstructed image. The above steps 54, 62, 68, 76 and 88 are repeated for a pre-specified number of iterations to obtain the reconstructed image.

In accordance with the present embodiment, the steps in the flowchart depicted in FIG. 4, may be mathematically expressed by the following equation:

$$\mu_j^{n+1} = \mu_j^n + \frac{\text{Back}(Fil^1([y_i - \hat{y}_i] \cdot W_i^1))}{\text{Back}(Fil^2(W_i^2))} \quad (2)$$

where, $\mu_j^n$ is the image estimate, $\mu_j^{n+1}$ is the updated image estimate, $y_i$ is the measured sinogram, $\hat{y}_i$ is the calculated sinogram, $W_i^1$ is the first weight factor, $W_i^2$, is the second weight factor, $\text{Back}(Fil^1([y_i-\hat{y}_i]\cdot W_i^1))$ is the first backprojection, $\text{Back}(Fil^2(W_i^2))$ is the second backprojection, and $Fil^1$ and $Fil^2$ are the filters.

Referring to equation (2), in accordance with embodiments of the present technique, the weight factors $W_i^1$ and $W_i^2$, and the filters $Fil^1$ and $Fil^2$ are assigned a plurality of values that in turn impact the convergence speed and computational cost of each iterative step and corresponding reconstruction as will be described in greater detail below.

Referring again to equation (2), in one embodiment of the present technique, the first weight factor is a non-identity weight factor and the filtering is performed using a non-identity filter. As used herein, the term "non-identity" refers to any value other than 1, assigned to the weight factor and the filter. An "identity" filter has a unit impulse response, and has no effect on the input signal.

In another embodiment, the first weight factor $W_i^1$ is an identity weight factor and the second weight factor $W_i^2$ is the product of a normalization term Proj1i and a calculated sinogram $\hat{y}_i$. Further, in accordance with this embodiment, the filtering step is performed using high pass filters. As will be appreciated by those skilled in the art, the application of high pass filters prior to the backprojection step improves the convergence speed of each iterative step and corresponding reconstruction.

In yet another embodiment, the first weight factor $W_i^1$ is a ratio of the measured sinogram $y_i$ and the calculated sinogram $\hat{y}_i$ and the second weight factor $W_i^2$ is the product of a normalization term Proj1i and a measured sinogram $y_i$. Further, in this embodiment, the filtering step is performed using an identity filter. Alternatively, the filtering step may also be performed using high pass filters. Therefore, in accordance with this embodiment, equation (2) may be alternatively expressed as follows:

$$\mu_j^{n+1} = \mu_j^n + \frac{\text{Back}([y_i/\hat{y}_i - 1] \cdot y_i)}{\text{Back}(Proj1_i \cdot y_i)} \quad (3)$$

Referring to equation (2) again, $W_i^1$, the first weight factor is represented by the ratio of the measured sinogram $y_i$ and the calculated sinogram $\hat{y}_i$, $(y_i/\hat{y}_i)$ in equation (3) and $W_i^2$, the second weight factor is represented by the product of the normalization term, Proj1i and the measured sinogram, $y_i$ in equation (3).

As will be appreciated by those skilled in the art, the first and the second backprojections performed in accordance with the present technique using the various modifications made to the weight factors and the filters as described above, impact the convergence speed and computational cost of each iterative step and corresponding reconstruction in a manner as will be described below.

Referring generally to equation (2), the second backprojection, denoted by the denominator, $\text{Back}(Fil^2(W_i^2))$ comprises a second weight factor, $W_i^2$, wherein $W_i^2$ may represent the product of a normalization term Proj1i and the measured sinogram $y_i$ (such as, for example, in equation (3)). Some existing iterative reconstruction techniques perform a second backprojection based on the calculated sinogram. Since, the calculated sinogram is generally not a pre-computable value, the backprojection of the calculated sinogram has to be performed, in general, at every iteration, thereby incurring a high computational cost, whereas the backprojection of the measured sinogram can be pre-computed and re-used in all iterations.

In equation (3), the calculated sinogram $\hat{y}_i$ is replaced by the measured sinogram $y_i$, thereby enabling the pre-computation of the backprojection in the denominator, $\text{Back}(Fil^2(W_i^2))$. (wherein, $W_i^2$ is the product of a normalization term and the measured sinogram $y_i$). As will be appreciated by those skilled in the art, replacing the calculated sinogram with the measured sinogram in the denominator, $\text{Back}(Fil^2(W_i^2))$ results in only one backprojection and only one projection being performed for every iteration and corresponding reconstruction, thereby resulting in a significant decrease in the computation time per iteration. Backprojection terms that depend on the measured sinogram require a one-time computation and hence are considered constant factors. However, this modification may in turn impact the convergence speed of the iterative reconstruction, since a greater number of iterations to reach convergence may need to be performed. Therefore, in order to improve the convergence speed of the iterative reconstruction, the embodiments of the present technique, in addition, propose a modification to the numerator (or the first backprojection 68) in equation (2), namely, $\text{Back}(Fil^1([y_i-\hat{y}_i]\cdot W_i^1))$. In one embodiment of the present technique, the proposed modification is reflected in equation (3), wherein the first weight factor $W_i^1$ in equation (2) is replaced by the ratio of the measured sinogram $y_i$ and the calculated sinogram $\hat{y}_i$, $(y_i/\hat{y}_i)$. With this modification, the convergence speed is maintained while effectively reducing the computation time per iteration.

In another embodiment of the present technique, the convergence speed of each iterative step and corresponding reconstruction may also be improved by applying the technique of parallel tangents. In this embodiment, after a pre-specified number of iterations, the difference between a current image estimate and an earlier image estimate is computed to obtain an update term. Then, the update term is multiplied with a desired relaxation factor and the result is added to the current image estimate. Thus, in accordance with this embodiment, the above technique may be expressed as follows:

$$img^{n+1} = img^n + \alpha(img^n - img^{n-N}) \quad (4)$$

where, $img^n$ is the current estimated reconstruction image at iteration n, $img^{n-N}$ is the estimated reconstruction image at the n-$N^{th}$ iteration, $img^{n+1}$ is the estimated reconstruction image at the n+$1^{th}$ iteration, $\alpha$ is the desired relaxaton factor and ($img^n - img^{n-N}$) is the update term. Further, in accordance with this embodiment, the choice of $\alpha$ is determined either by fixing it to a predetermined constant, or by performing a one-dimensional optimization of a cost function (for example, the least squares error between the updated image and the measured sinogram).

Figure 5:
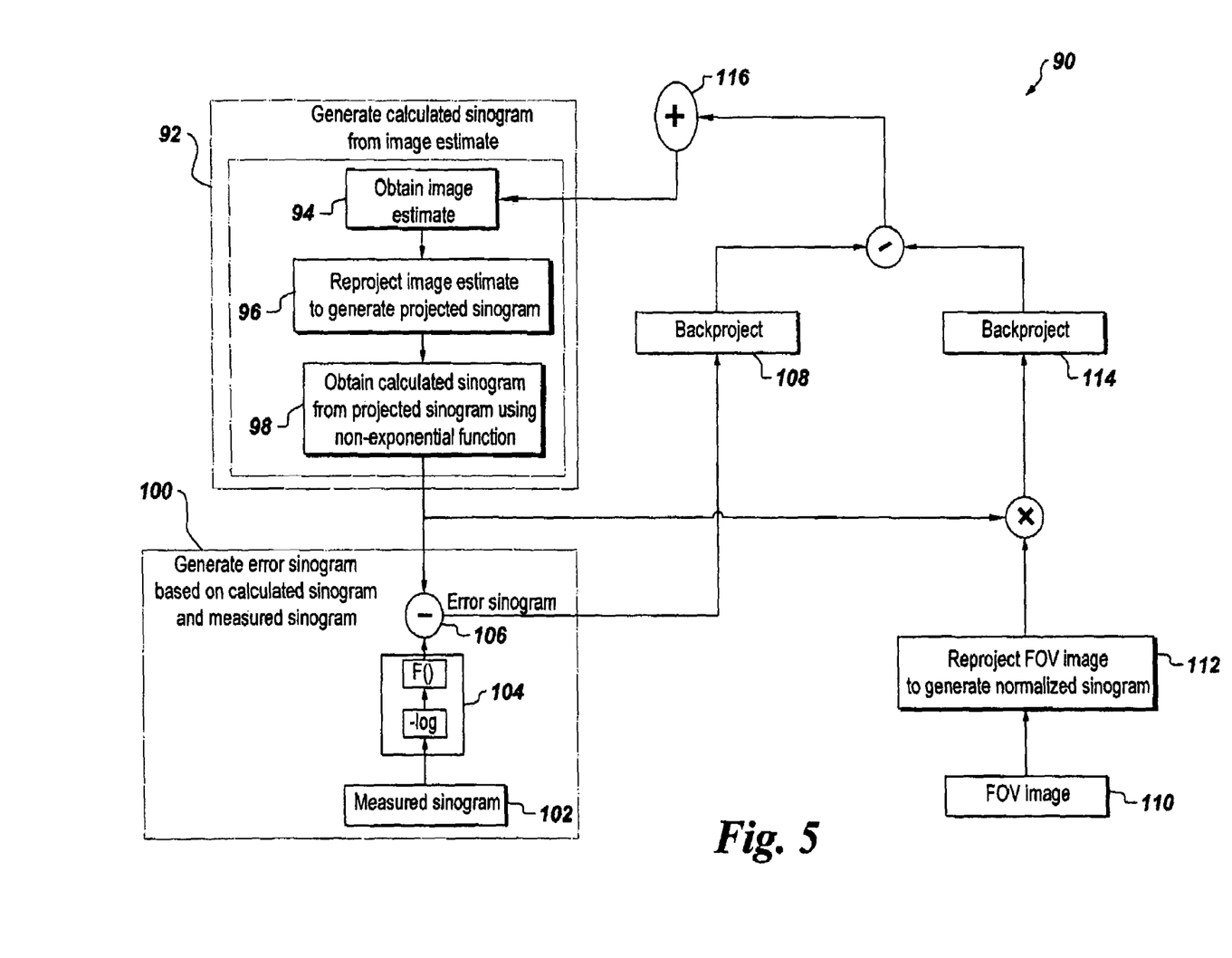
FIG. 5 is a flowchart of exemplary logic including exemplary steps for iteratively reconstructing image data acquired by the CT system of FIG. 1 in accordance with a second embodiment of the present technique.

FIG. 5 is a flowchart 90 of exemplary logic including exemplary steps for iteratively reconstructing an image acquired by the CT system 10 of FIG. 1 in accordance with a second embodiment of the present technique. In step 92, a calculated sinogram is generated from an image estimate. In accordance with this embodiment, step 92 comprises obtaining an image estimate in step 94, reprojecting the image estimate to obtain a projected sinogram in step 96, and obtaining a calculated sinogram in step 98. In accordance with this embodiment, the calculated sinogram is obtained by converting the projected sinogram from the attenuation domain to the intensity domain. More specifically, in this embodiment, a non-exponential function is used to convert the projected sinogram from the attenuation domain to the intensity domain to generate the calculated sinogram. Further, in accordance with the present embodiment, the non-exponential function is a polynomial function.

As will be appreciated by those skilled in the art, the computation of the calculated sinogram $\hat{y}_i$, typically involves an exponential function, which is generally computationally expensive, especially when implemented in computer hardware entities such as Field Programmable Gate Arrays (FPGA's). In accordance with the present embodiment, the exponential function, for example, as depicted in equation (2), is replaced by an approximation function such as, for example, a polynomial function. The polynomial functions may comprise linear functions or rational functions. Further, in this embodiment, in order to prevent error propagation (due to the introduction of the approximation function in the calculated sinogram) in each iteration and corresponding reconstruction, the present embodiment applies an equivalent approximation function to the measured sinogram 102. In step 104, the measured sinogram 102 is approximated by an equivalent function, denoted by F( ) by the application of a negative logarithmic function to the measured sinogram 102. As indicated above, the function F( ) may represent any polynomial function, such as a linear function or a rational function.

Referring again to FIG. 5, in step 100, an error sinogram 106 is generated by taking a difference between the calculated sinogram 98 and the measured sinogram 102. In step 108, a first backprojection is performed. In accordance with this embodiment, the first backprojection 108 is a backprojection of the error sinogram 106. In step 114, a second backprojection is performed, based on the product of a normalization term generated in step 112 and the calculated sinogram 98. In accordance with the present technique, the normalization term generated in step 112 is pre-calculated based on reprojecting a field of view (FOV) image 110. In step 116, the image estimate 94 is iteratively updated by adding the result of a ratio of the first backprojection 108 and the second backprojection 114 to obtain the reconstructed image.

The embodiments illustrated and described above provide a technique for iteratively reconstructing image data acquired from an imaging system. The embodiments described above have several advantages compared to existing iterative reconstruction techniques including reduced computational cost per iteration and an improvement of the convergence speed of the iterative reconstruction without an increase in the required number of iterations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for iteratively reconstructing an image acquired by a computed tomography (CT) system comprising:

generating a calculated sinogram from an image estimate;

generating an error sinogram based on the calculated sinogram and a measured sinogram;

performing two or more backprojections, comprising a first backprojection and a second backprojection, each based upon a reconstruction parameter, wherein the reconstruction parameter in the first backprojection is a first weight factor and the reconstruction parameter in the second backprojection is a second weight factor, wherein the reconstruction parameter impacts at least one of convergence speed and computational cost of each iterative step and corresponding reconstruction, and wherein a filtering step is performed prior to performing the two or more backprojections; and updating the image estimate by adding corresponding results of the two or more backprojections to the image estimate to generate a reconstructed image.

2. The method of claim 1, wherein the steps of generating a calculated sinogram, generating an error sinogram, performing two or more backprojections and updating the image estimate is repeated for a pre-specified number of iterations to obtain the reconstructed image.

3. The method of claim 1, wherein the calculated sinogram represents X-ray intensity data generated from X-ray attenuation data, using an exponential function.

4. The method of claim 1, wherein the first weight factor is a non-identity weight factor.

5. The method of claim 4, wherein the filtering step is performed using a non-identity filter.

6. The method of claim 1, wherein the first weight factor is a function of the measured sinogram and the calculated sinogram, and the second weight factor is based on the measured sinogram.

7. The method of claim 6, wherein the filtering is performed using a high-pass filter and wherein the high-pass filter improves the convergence speed of each iterative step and corresponding reconstruction.

8. The method of claim 6, wherein the filtering step is performed using an identity filter.

9. The method of claim 1, wherein the first weight factor is an identity weight factor and the second weight factor is the calculated sinogram.

10. The method of claim 9, wherein the filtering step is performed using a high-pass filter and wherein the high-pass filter improves the convergence speed of each iterative step and corresponding reconstruction.

11. A method for iteratively reconstructing an image acquired by a computed tomography (CT) system comprising:
generating a calculated sinogram from an image estimate;
generating an error sinogram based on the calculated sinogram and a measured sinogram;
performing a first backprojection based on the product of the error sinogram and a first weight factor, wherein a filtering step is performed prior to the first backprojection and wherein the first weight factor comprises a non-identity weight factor; and
performing a second backprojection based on a second weight factor, wherein a filtering step is performed prior to the second backprojection; and wherein the image estimate is iteratively updated by adding the result of a ratio of the first backprojection and the second backprojection to the image estimate to obtain the reconstructed image.

12. The method of claim 11, wherein the calculated sinogram represents X-ray intensity data generated from X-ray attenuation data, using an exponential function.

13. The method of claim 11, wherein the filtering is performed using a non-identity filter.

14. The method of claim 11, wherein the first weight factor is a function of the measured sinogram and the calculated sinogram, and wherein the second weight factor is based on the measured sinogram.

15. The method of claim 14, wherein the filtering step is performed using an identity filter.

16. The method of claim 14, wherein the filtering is performed using a high-pass filter and wherein the high-pass filter improves the convergence speed of each iterative step and corresponding reconstruction.

17. The method of claim 11, wherein the first weight factor is an identity weight factor and wherein the second weight factor is based on the calculated sinogram.

18. The method of claim 17, wherein the filtering is performed using a high-pass filter and wherein the high-pass filter improves the convergence speed of each iterative step and corresponding reconstruction.

19. A method for iteratively reconstructing an image acquired by a computed tomography (CT) system comprising:
generating a calculated sinogram from an image estimate, wherein the calculated sinogram is computed using an approximation function, wherein the approximating function approximates an exponential function;
generating an error sinogram based on the calculated sinogram and a measured sinogram; and
iteratively updating the image estimate by adding the result of a ratio of a first backprojection and a second backprojection to the image estimate to obtain the reconstructed image.

20. The method of claim 19 further comprises applying an equivalent approximation function to the measured sinogram.

21. The method of claim 19, wherein the first backprojection is a backprojection of the error sinogram.

22. The method of claim 19, wherein the second backprojection is based upon a calculated sinogram.

23. The method of claim 19, wherein the approximation function is a polynomial function.

24. The method of claim 23, wherein the polynomial functions comprise linear functions and rational functions.

25. A computed tomography system for iteratively reconstructing an image comprising:
an X-ray source configured to project a plurality of X-ray beams through an object;
a detector configured to produce a plurality of electrical signals in response to received X-ray beams from the source; and
a system controller configured to process the plurality of electrical signals to generate a calculated sinogram from an image estimate, wherein the system controller is further configured to generate an error sinogram based on the calculated sinogram and a measured sinogram; perform two or more backprojections, comprising a first backprojection and a second backprojection, based on a reconstruction parameter, wherein the reconstruction parameter in the first backprojection is a first weight factor and the reconstruction parameter in the second backprojection is a second weight factor, wherein the reconstruction parameter impacts at least one of convergence speed and computational cost of each iterative step and corresponding reconstruction, and wherein a filtering step is performed prior to the two or more backprojections; and updating the image estimate by adding corresponding results of the two or more backprojections to the image estimate to generate a reconstructed image.

* * * * *